(12) United States Patent
Chang et al.

(10) Patent No.: US 7,643,410 B2
(45) Date of Patent: Jan. 5, 2010

(54) METHOD AND APPARATUS FOR MANAGING A CONNECTION IN A CONNECTION ORIENTATED ENVIRONMENT

(75) Inventors: Naichih Chang, Shrewsbury, MA (US); Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 11/394,057

(22) Filed: Mar. 29, 2006

(65) Prior Publication Data

US 2007/0237174 A1  Oct. 11, 2007

(51) Int. Cl.
*H04J 1/16* (2006.01)

(52) U.S. Cl. .................. 370/229; 370/248; 370/467; 710/309; 710/310

(58) Field of Classification Search ............ 370/401, 370/400, 389, 351, 467, 466, 465, 464, 229, 370/230, 252, 241, 248, 338, 412, 413, 498; 709/230, 250, 227, 223; 710/38, 52, 305, 710/388, 15, 36, 74, 10, 33, 309, 310, 200; 711/4, 113, 112, 114, 120, 147, 170
See application file for complete search history.

(56) References Cited

U.S. PATENT DOCUMENTS

| | | | | |
|---|---|---|---|---|
| 5,680,402 | A * | 10/1997 | Olnowich et al. | 370/498 |
| 6,523,098 | B1 * | 2/2003 | Anderson | 711/158 |
| 6,851,011 | B2 * | 2/2005 | Lin | 711/4 |
| 7,340,551 | B2 * | 3/2008 | Elliott et al. | 710/309 |
| 7,457,902 | B2 * | 11/2008 | Yang et al. | 710/200 |
| 7,496,700 | B1 * | 2/2009 | Chong et al. | 710/52 |
| 7,536,508 | B2 * | 5/2009 | Davies | 711/114 |
| 2001/0056486 | A1 | 12/2001 | Kosaka | |
| 2002/0131368 | A1 * | 9/2002 | Raftelis et al. | 370/241 |
| 2003/0093541 | A1 * | 5/2003 | Lolayekar et al. | 709/230 |
| 2003/0117280 | A1 | 6/2003 | Prehn | |
| 2004/0267982 | A1 * | 12/2004 | Jackson et al. | 710/52 |
| 2004/0268358 | A1 | 12/2004 | Darling et al. | |
| 2006/0101171 | A1 * | 5/2006 | Grieff et al. | 710/36 |
| 2006/0104295 | A1 * | 5/2006 | Worley et al. | 370/401 |
| 2006/0106997 | A1 * | 5/2006 | Elliott et al. | 711/150 |
| 2007/0088860 | A1 * | 4/2007 | Chang et al. | 710/15 |
| 2007/0136521 | A1 * | 6/2007 | Voorhees et al. | 711/112 |
| 2007/0192639 | A1 * | 8/2007 | Nichols et al. | 713/300 |
| 2008/0098106 | A1 * | 4/2008 | Mimatsu | 709/223 |

FOREIGN PATENT DOCUMENTS

WO  2007/117878 A1  10/2007

OTHER PUBLICATIONS

Dell/Intel/Maxtor/Seagate/Vitesse, Serial ATA II: Extensions to Serial ATA 1.0a, Rev. 1.2, Aug. 27, 2004, 106 pages.
Apt/Dell/Intel/Maxtor/Seagate, "Serial ATA: High Speed Serialized AT Attachment", Rev. 1.0a, Jan. 7, 2003, 310 pages.
International Search Report of the Inernational Searching Authority; Dated Aug. 14, 2007; PCT/US2007/064314 (2 pgs).
International Preliminary Report on Patentability for Patent Application No. PCT/US2007/064314, mailed Oct. 9, 2008, 8 pages.

* cited by examiner

*Primary Examiner*—Aung S Moe
*Assistant Examiner*—Abdullah Riyami

(57) ABSTRACT

A bridge for translating a first storage protocol to a second protocol includes an affiliation manager. The affiliation manager accepts a connection from a host and establishes a connection between a device that uses the second protocol and the host that uses the second protocol. The affiliation manager monitors commands received from the host and responses received from the device on the connection. Upon detecting no pending commands for the device, the bridge may close the connection to the host if there is another host requesting a new connection to the device and establish the new connection between the device and the other host.

12 Claims, 6 Drawing Sheets

METHOD AND APPARATUS FOR MANAGING A CONNECTION IN A CONNECTION ORIENTATED ENVIRONMENT

FIELD

This disclosure relates to connection management in a system that provides redundant paths to devices and in particular to redundant paths to Serial Advanced Technology Attachment (SATA) devices.

BACKGROUND

Point-to-point storage protocols such as the Serial Advanced Technology Attachment (SATA) protocol support one active communication between a storage device and a host bus adaptor at a time. In a multi-host bus adaptor system, a port selector may be coupled between a plurality of host bus adaptors and the storage device to provide redundant paths by allowing the plurality of host bus adaptors to access the storage device. Although, all of the host bus adaptors may access the storage device, there can only be one active communication between one of the host bus adaptors and the storage device at any one time. The storage device is unaware of the multiple host bus adaptors.

When a connection is established between a host bus adapter and the storage device in a connection oriented environment, the host bus adapter is given exclusive access to the storage device until all of the pending commands in the storage device are complete. The current connection may be closed and another connection may be established between another one of the host bus adaptors and the storage device when all pending commands for the current host bus adaptor have completed. Thus, each host bus adaptor in a multi-host system manages their connection to a storage device to ensure that the connection is not closed until all pending commands have been completed.

A host bus adaptor having a Serial Attached Small Computer System Interface (SAS) that supports multi-host access to storage devices may communicate with a SATA device using the SATA Tunneled Protocol (STP). STP is a connection orientated protocol between an STP host or host bus adaptor and a SATA device which establishes a tunnel in a SAS environment and allows SATA Frame Information Structures (FISs) to be exchanged.

Multiple STP hosts may connect to a SATA device via several SAS expanders or multi-level SAS expanders and a STP/SATA bridge using STP. A STP/SATA bridge device is a device containing an STP target port, a SATA host port, and the functions required to forward information between the STP target port and the SATA host port to enable STP host ports in a SAS domain to communicate with SATA devices in a SATA domain. The STP/SATA may be included in one of the SAS Expanders.

When the STP/SAS bridge accepts a connection for a storage device from a STP host, the STP target in the STP/SAS bridge establishes an affiliation for the storage device to that particular STP host. The STP/SATA bridge cannot accept any connections for that storage device from any other STP host until the affiliation is cleared by the STP host or the STP/SATA bridge is reset.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
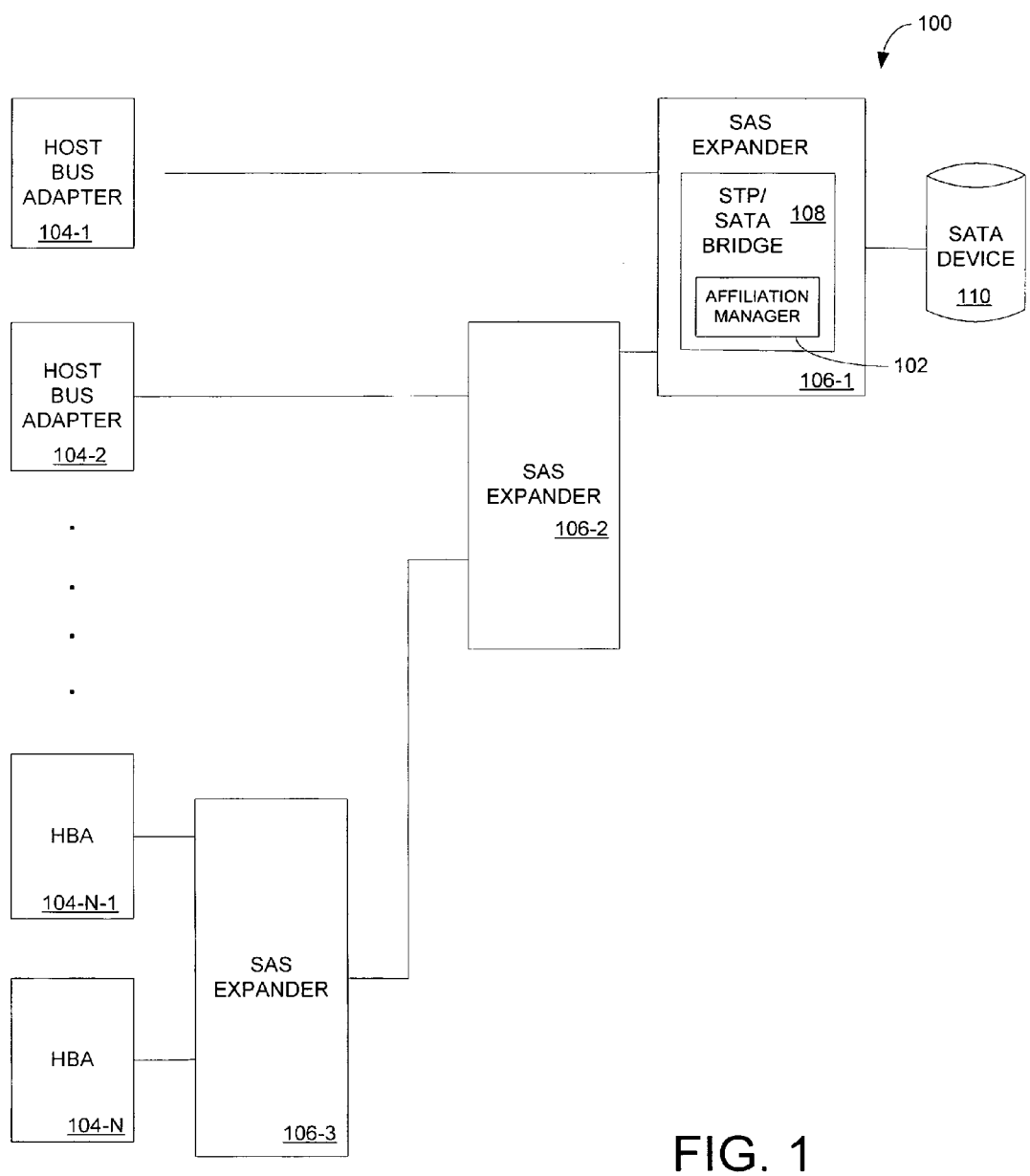
FIG. 1 is a block diagram of a storage system including an embodiment of an affiliation manager according to the principles of the present invention.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

In an embodiment of the invention, time to close a connection is reduced by monitoring the activity for a connection in a Serial Advanced Technology Attachment (SATA) Tunneled Protocol (STP)/SATA bridge instead of waiting for an STP host to close the connection. By monitoring activity for the connection, the STP/SATA bridge may close the connection when there are no pending commands associated with the current STP host and there is a request from another STP host to connect to the storage device at the other side of the STP/SATA bridge. The monitoring is performed by an affiliation manager in the STP/SATA bridge allowing STP hosts without affiliation management support to access SATA storage devices through the STP/SATA bridge.

By supporting affiliation management in the STP/SATA bridge, the overall Input/Output performance of the system is improved because software/memory accesses and processor computing needs are reduced. Additionally, link utilization is optimized by automatically closing the connection when there are no pending commands and another STP host is waiting to access the SATA device.

An embodiment of the invention will be described for a STP/SATA bridge which transfers frames from a Serial Attached Small Computer System Interface (SAS) domain to a SATA domain. A version of the SAS protocol is described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by ANSI (hereinafter termed the "SAS Standard"). A version of the SATA protocol is described in "Serial ATA: High Speed Serialized AT Attachment," Revision 1.0a, published on Jan. 7, 2003 by the Serial ATA Working Group (hereinafter termed the "SATA standard"). The SATA II protocol defines extensions to the SATA standard protocol The SATA II protocol provides support for a redundant path to a SATA device through the use of a port selector. The port selector allows two different host bus adaptors to connect to the same SATA device to create a redundant path to the device allowing a host bus adaptor to be repaired, replaced or upgraded while still providing access to the SATA device through the other host bus adaptor. Although each of the host bus adaptors can access the SATA device, only one connection from one of the host bus adaptors to the SATA device may be active at a time. To increase the number of STP hosts that can connect to a SATA device, a SAS storage system may include a plurality of SAS expanders or multi-level SAS expanders and a STP/SATA bridge.

FIG. 1 is a block diagram of a storage system 100 including an embodiment of an affiliation manager 102 according to the principles of the present invention. The affiliation manager 102 manages a connection from one of a plurality of Host Bus Adaptors 104-1, ..., 104-n through one or more SAS expanders 106-1, ... 106-3 and a STP/SATA bridge 108 to a SATA device 110.

The STP/SATA bridge 108 is an expander device that includes a STP target port, a SATA host port and functions required to forward frames between the STP target port and SATA host port to enable STP ports in a SAS domain to communicate with a SATA device 110 in a SATA domain. The SAS protocol includes a SATA Tunneled Protocol (STP) which allows a SAS host, for example, host bus adaptor 104-1, to access a SATA device 110 by using STP to establish a tunnel in a SAS environment allowing SATA FISs to be exchanged. The SATA device 110 may be a disk drive, flash card, compact disk (CD) drive, digital video disk (DVD) drive or tape drive.

SAS Expander 106-1 is coupled to SATA device 110 and tunnels SATA FISs over SAS for transport to the Host Bus Adaptors (STP hosts) 104-1, . . . , 104-N. The STP/SATA bridge 108 may be physically located in the SAS expander 106-1 as in the embodiment shown in FIG. 1.

Hand shaking and event signaling is performed between the STP host and STP target in the STP/SATA bridge 108 through the use of primitives. A primitive is a defined sequence of 4 bytes beginning with a special 10-bit character, such as, K28.5 or K28.3. SAS primitives are used for a variety of signaling and handshaking functions, for example, the CLOSE primitive to close a connection and the OPEN primitive to open a connection. An 'Open' Address Frame is typically used to open a connection between the STP host and the STP target. The connection is opened when the STP host receives an Open Accept primitive from the STP target.

After the connection has been opened, the STP host in the host bus adaptor 104-1, . . . , 1-4-n and STP target port in the STP/SATA bridge 108 exchange SATA FISs. A SATA FIS includes multiple double-words (32-bits) and starts with a primitive (Start of Frame (SOF)) followed by a payload, a Cyclic Redundancy Check (CRC) and ends with another primitive (End of Frame (EOF)). The FIS includes a FIS type field that indicates the type of payload included in the frame. There are many types of payload identified by the type field that are defined by the SATA standard. These include command, status and Set Device Bits (SDB) (FIS type A1h). In an embodiment, the command includes a Register FIS—Host to Device (FIS type 27h) and the status includes a Register FIS—Device to Host (FIS type 34h). The format of a FIS for each FIS type is described in "Serial ATA: High Speed Serialized AT Attachment," Revision 1.0a, published on Jan. 7, 2003 by the Serial ATA Working Group. The SAS expander handles the routing of a SATA FIS in a connection established path in a SAS environment to the SATA device 110.

As more than one STP host may concurrently be requesting access to the same SATA device, affiliations are used to prevent device contention. Affiliation is a state entered by a STP target port where it refuses to accept connection requests from an STP host other than the one that had established a connection. Through the use of an affiliation, an STP host has exclusive access to a SATA device until affiliation is cleared.

The affiliation manager 102 in the STP/SATA bridge 108 manages affiliation between a STP host and the STP target port. Affiliation can be cleared by the STP host by issuing a CLOSE primitive to the STP target port requesting that affiliation be cleared. The connection can be temporarily closed by the STP host without clearing the affiliation by sending a normal CLOSE primitive to the STP target port to allow another SATA device to be connected to the STP host or a Serial Management Protocol (SMP) command to be issued to the SAS expander.

Figure 2:
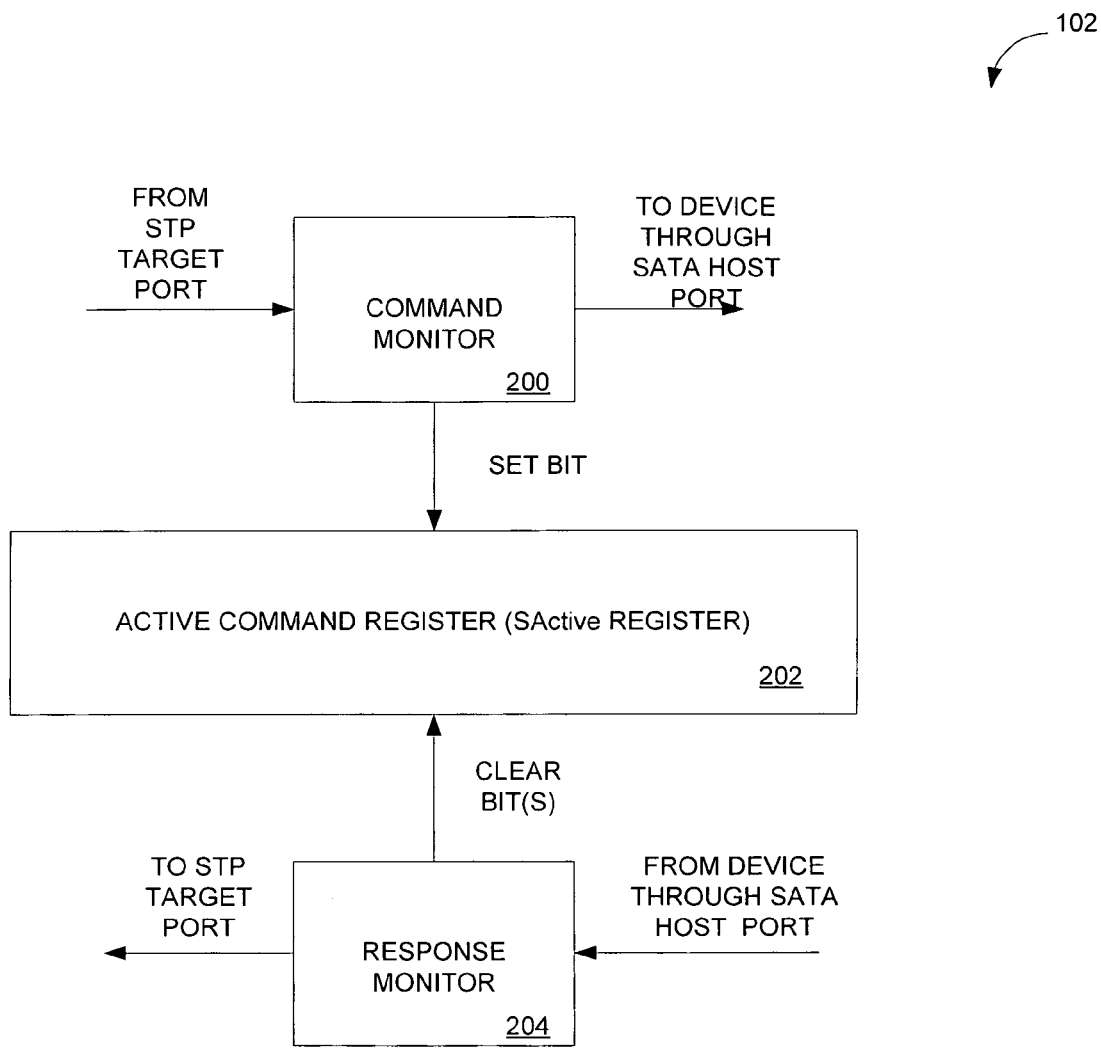
FIG. 2 is a block diagram of an embodiment of an affiliation manager included in the STP/SATA bridge shown in FIG. 1.

FIG. 2 is a block diagram of an embodiment of an affiliation manager 102 included in the STP/SATA bridge 108 shown in FIG. 1.

In the embodiment shown, the SATA device 110 supports Native Command Queuing (NCQ) which allows a plurality of commands to be queued in the SATA device. NCQ improves the performance of a SATA device by allowing a SATA device to optimize the execution order of read and write requests. Instead of executing commands in the order in which they are received, the SATA device's internal command queue is reordered for optimal performance, for example, the commands may be reordered to reduce the amount of seek time in a hard drive based on the physical location of data in the read and write requests.

Through the use of NCQ, a SATA device 110 may maintain up to 32 pending commands and may order processing of those commands. Each queued command is identified by a tag value. In an embodiment in which there may be up to 32 pending commands, 32 bits (4-bytes) are provided in a Set Device Bits FIS which is sent from the SATA device 110 to convey the pending status of each of the 32 possible pending commands in the SATA device 110. The 32-bits are handled as a 32-bit element array of active command (SActive) bits, one for each possible pending command. The array is bit significant such that bit 'n' in the array corresponds to the pending status of the command with a tag value of 'n'.

The affiliation manager 102 includes an active commands register (SActive register) 202 for managing affiliation between a STP host and a STP target. In one embodiment, the SActive register 202 has 32-bits, with one bit corresponding to each possible pending command. Bit 0 corresponds to a command with a tag value 00h and bit 31 corresponds to a command with tag value 01Fh. A bit is set to '1' if there is a command pending and to '0' otherwise. Instead of managing affiliation in each STP host, one SActive register shared by all STP hosts is included in the STP/SATA bridge 108. Thus, the STP/SATA bridge 108 acts as an "intelligent" bridge to manage affiliation for the STP hosts, resources are optimized and bandwidth usage between the STP hosts and the STP/SATA bridge to manage affiliation is reduced. The command monitor 200 monitors SATA FISs that are forwarded through the STP/SATA bridge 108 from a STP host port to a SATA target port, detects SATA command FISs and extracts the NCQ tag included in each SATA command FISs. The NCQ tag identifies the tag value assigned to the current command being sent to the SATA device 110. The tag value corresponds to one of the 32 bits in the SActive register 202.

In the embodiment shown, each time that a command FIS, for example, a Host to Device (27h) Register FIS arrives at a STP target port in the STP/SATA bridge 108 to be forwarded to the SATA device 110 through the SATA host port, a bit corresponding to the NCQ tag value stored in the command FIS is set to '1' in the SActive register 202. In non-NCQ mode, as there can only be one pending command in the SATA device only bit 0 is set to '1' in the SActive register 202 while the command is pending.

A status monitor 204 in the affiliation manager monitors each status FIS received at the target port in the STP/SATA bridge 108 from the SATA device 110 to be forwarded to the host port. For example, a Set Device Bits FIS received from the SATA device 110 to the SATA host port through the STP/SATA bridge 108 provides the status of pending commands that are queued in the SATA device 110. The Set Device Bits FIS includes a 32 bit SActive field with each bit corresponding to one of the possible queued commands. Based on the state of the bits in the SActive field included in the Set Device Bits FIS, the status monitor 204 clears bits in the SActive register 202 in the affiliation manager based on the state of the SActive field in the Set Device Bits FIS or clears bit 0 in non-NCQ mode based on the status FISs.

Figure 3:
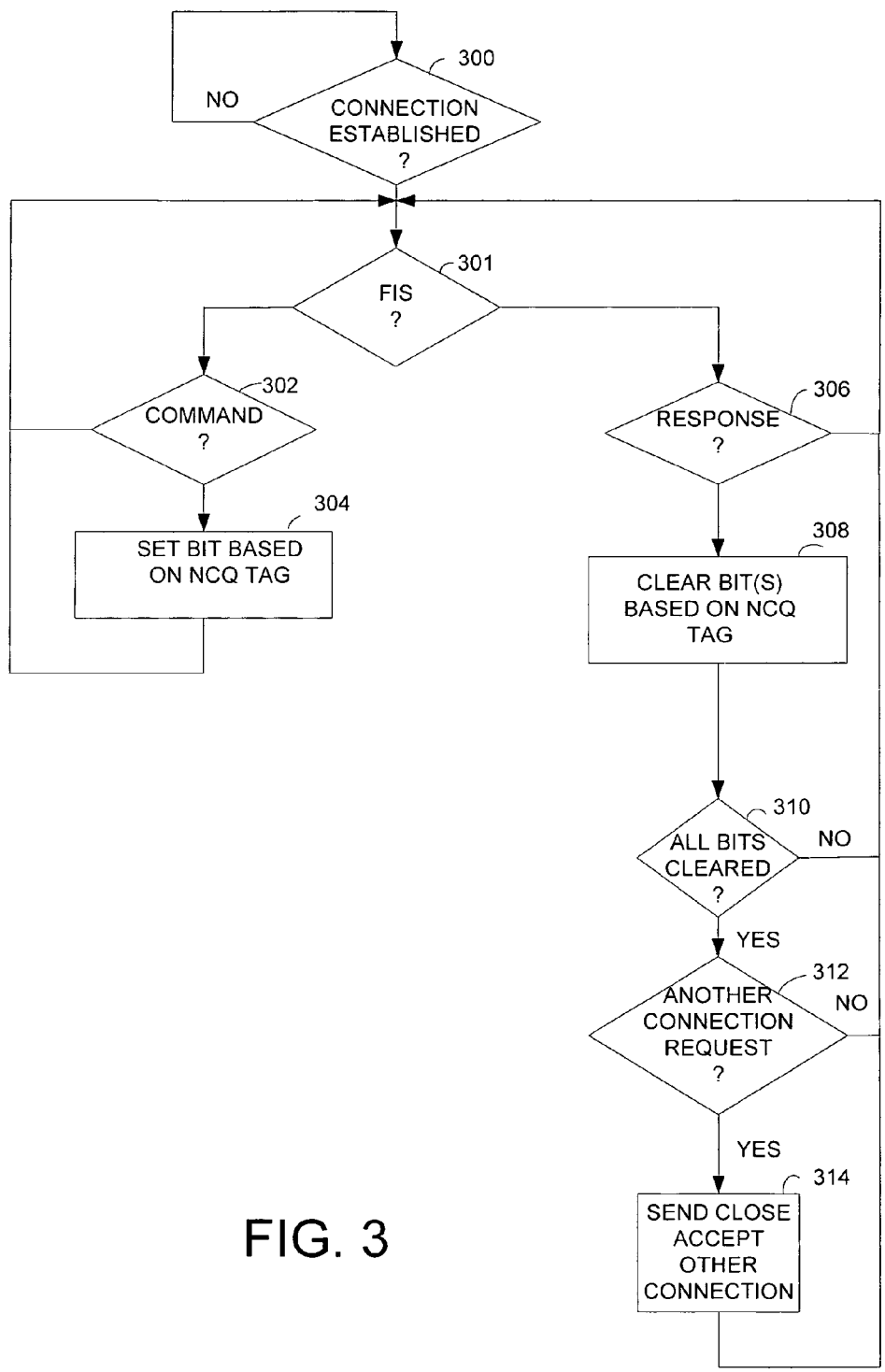
FIG. 3 is a flow diagram of an embodiment of a method for monitoring activity of a connection.

FIG. 3 is a flow diagram for an embodiment of a method for monitoring activity of a connection. FIG. 3 will be described in conjunction with FIG. 2 for a SATA device that supports Native Command Queuing.

At block 300, the affiliation manager 102 checks if a connection has been established between an STP host and the STP target port in the STP/SATA bridge 108. If a connection has not been established, processing continues with block 300, to wait for a connection to be established. As already discussed, a connection is established between an STP host and a STP target port in an STP/SATA bridge through the exchange of primitives. A connection is established between the STP host and the STP target port in the STP/SATA bridge 108 and ultimately to the SATA device 110. If a connection has been established, processing continues with block 301 to process SATA FISs received from the SATA device or the STP host.

At block 301, the command monitor 200 checks for a SATA FIS received from the STP port and the status monitor 204 checks for a SATA FIS received through the SATA port from the SATA device 110. If a SATA FIS is received by the STP port, processing continues with block 302. If a SATA FIS is received by the SATA port, processing continues with block 306.

At block 302, the command monitor 200 checks the FIS type in the FIS received at the STP port in the STP/SATA bridge 108. If the FIS type indicates a command FIS, processing continues with block 304. If not, processing continues with block 301 to wait for another SATA FIS to be received by the SATA port or the STP port.

At block 304, if operating in NCQ mode, the command monitor 200 sets a bit in the active command register 202 corresponding to the value of the NCQ tag included in the command FIS. If operating in non-NCQ mode, only bit 0 of the active command register 202 is set as there can only be one active command in the SATA device. Processing continues with block 301 to wait for another SATA FIS to arrive at the STP port or the SATA port.

At block 306, the status monitor 204 checks the FIS type in the FIS received by the SATA port. If the FIS type is a Set Device Bits FIS or a Device to Host Status Register FIS, processing continues with block 308. If not, processing continues with block 301 to wait for another SATA FIS to be received by the STP port or the SATA port.

At block 308, if operating in NCQ mode, the bit in the active command register 202 that corresponds to the NCQ tag in the received FIS is cleared. If operating in non-NCQ mode, bit 0 in the active command register 202 is cleared. Processing continues with block 310.

At block 310, the status monitor 204 in the affiliation manager 102 checks if all commands issued to the SATA device have been completed, that is, if all bits in the active command register 202 have been cleared (set to zero). If so, processing continues with block 312. If not, processing continues with block 301 to wait for another SATA FIS.

At block 312, the affiliation manager 102 checks if there is another STP host requesting access to the SATA device 110. With no pending commands for the current connection, the affiliation manager 102 may close the current connection if there is a request pending from another STP host and may leave the current connection open if there is no pending request. In an alternate embodiment, the connection may be closed even if there are no requests pending from another host and the link has been idle for a time period which may be user definable. If there is a pending request from another host or the link has been idle for a time period, processing continues with block 314. If not, processing continues with block 301 to wait for a SATA FIS.

At block 314, a close connection primitive is sent to the original STP host and the connection to the other STP host is accepted. Thus, if there is another STP host waiting to use the device, the connection between the current STP host and the device is automatically closed instead of waiting for the STP host to close the connection. This increases the utilization of the link bandwidth between the STP hosts and the SATA device. The STP/SATA bridge 108 can accept a connection request from another STP host and the active command register 202 can be used to monitor pending commands for the connection. With the STP/SATA bridge 108 monitoring pending commands for the connection, each STP host does not need to support affiliation management.

An embodiment has been described for a SATA device that supports Native Command Queuing. When operating in non Native Command Queuing mode, a status FIS is sent to indicate that the command is complete and may be used to monitor the status of pending commands in the device. With only one pending command, the status FIS is sufficient to indicate the status of the pending command. When operating in Native Command Queuing mode, a status FIS is sent from a device to a host only indicates that the host can send another command FIS to be added to the device queue. Thus, when operating in Native Command Queuing mode, an additional FIS (the SDB FIS) provides status of pending commands in the device by indicating the commands that have been completed.

An embodiment has been described for a case in which all pending commands are completed without error. However, there may be error conditions, for example, the device may not send back the NCQ command status. In that case, the host may timeout the command and may re-issue the command. However, the corresponding bit in the active command register in the bridge will not be cleared because a SDB FIS is not sent by the SATA device. Therefore, after the command times out, the STP host may send a Serial Management Protocol (SMP) command to the bridge to clear the bit or decrement the counter.

Also, according to the SATA standard, if NCQ commands are used, then all pending commands in the SATA device 110 must be NCQ commands. If the host issues any other type of command, for example, a Programmed Input Output or regular Direct Memory Access commands, the SATA device 110 will abort all the pending NCQ commands. In this case, the SATA device 110 will send a Set Device Bits FIS to clear all the bits in the active command register after it receives a non-NCQ command with pending NCQ commands. The STP host may also check that all of the bits in the SAactive register have been cleared.

Another error condition may occur if the SATA device 110 is reset, for example, due to an Out of Band (OOB) signal on the link to the SATA device 100. The STP/SATA bridge 108 can clear the active command register (set all bits to '0') 202 upon detecting this error condition or the STP host can clear the active command register 202 in the STP/SATA bridge 108.

In an alternate embodiment, instead of using an active command register to monitor pending commands for a connection, the pending commands in the SATA device are monitored through the use of a transaction counter.

Figure 4:
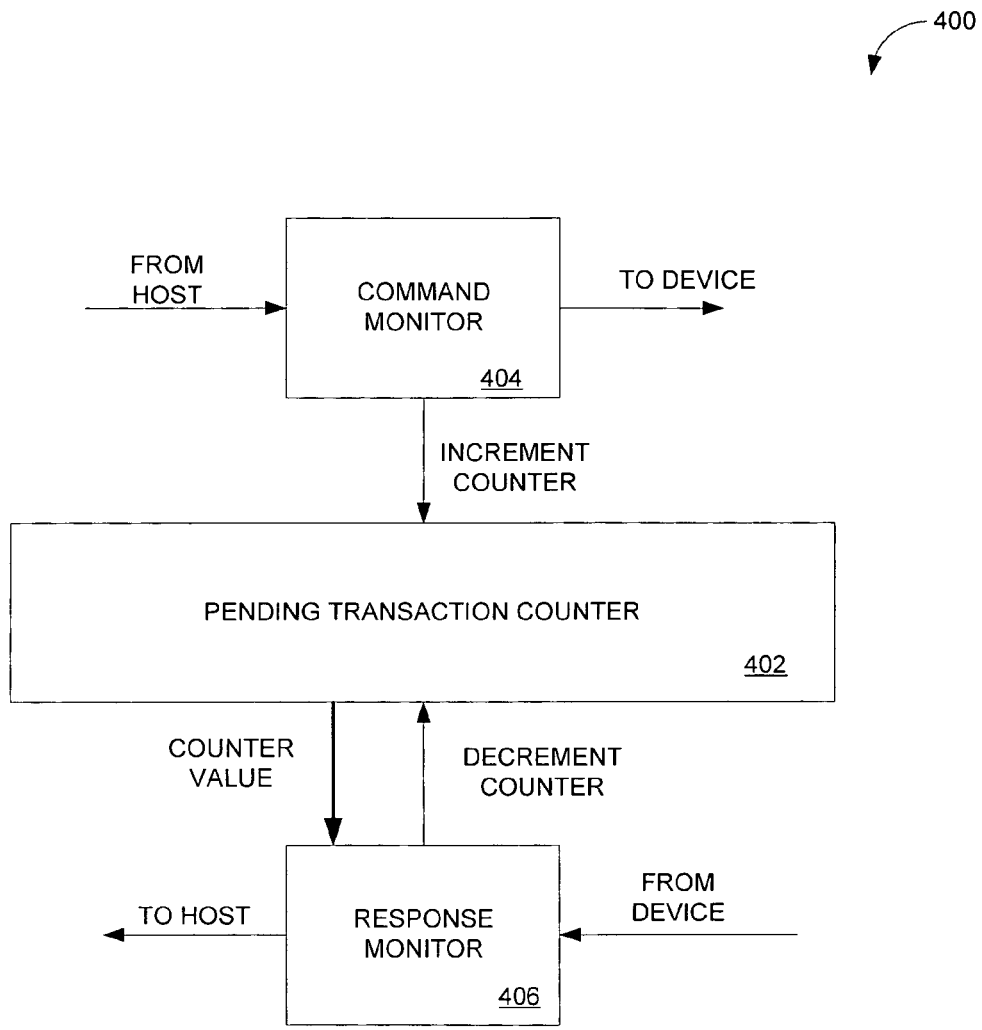
FIG. 4 is a block diagram of another embodiment of an affiliation manager in the STP/SATA bridge shown in FIG. 1.

FIG. 4 is a block diagram of another embodiment of an affiliation manager 400 in the STP/SATA bridge 108 shown in FIG. 1. The affiliation manager 400 includes a pending transaction counter 402, a command monitor 404 and a status monitor 406. While a connection is established between an STP host and a SATA device, the pending transaction counter 402 is set to a default value and is incremented each time the command monitor 404 detects a command FIS received by the STP port to be forwarded to the SATA device 110. The pending transaction counter 402 is decremented each time a Set Device Bits FIS in NCQ mode with no error is sent from the device to the host for the particular connection.

If the pending transaction counter 402 is at the default value and there is another STP host requesting access to a device behind the STP/SATA bridge 108, then a close connection request is sent to the current STP host and the STP/SATA bridge 108 automatically sends an accept connection primitive to the other STP host. For example, the other STP host may send an Open Address Frame to the STP/SATA bridge 108 to request to establish a connection. If there are still pending commands for the current connection based on the count value stored in the pending transaction counter 402, the STP/SATA bridge 108 may notify the requesting STP host that the device is busy or just reject the connection request. However, if there are no pending commands for the current connection, that is, the pending transaction counter 402 is at the default value, the STP/SATA bridge 108 can close the connection and establish the new connection between the other requesting STP host and the device.

Embodiments of an affiliation manager 400 have been described for an affiliation manager that connects a single SATA device to multiple STP hosts. A port multiplier is a mechanism for one active host connection to communicate with multiple SATA devices. For example, a SATA II port multiplier allows a STP host to concurrently communicate with up to 15 devices. The STP host knows that it is communicating with multiple devices but the devices are unaware that they are being multiplexed. The multiplexing is performed through the use of a port multiplier port field in a FIS. The port multiplier stores and forwards SATA FISs from the STP host based on the port multiplier port field.

As a connection established between a STP host and a STP target port in the STP/SATA bridge 108, there may be pending commands for up to 15 different devices when a port multiplier is coupled to the STP/SATA bridge 108. Thus, the embodiments of the affiliation managers 102, 400 discussed in conjunction with FIG. 2 and FIG. 4 may be modified to support a port multiplier as shown in FIGS. 5 and 6.

Figure 5:
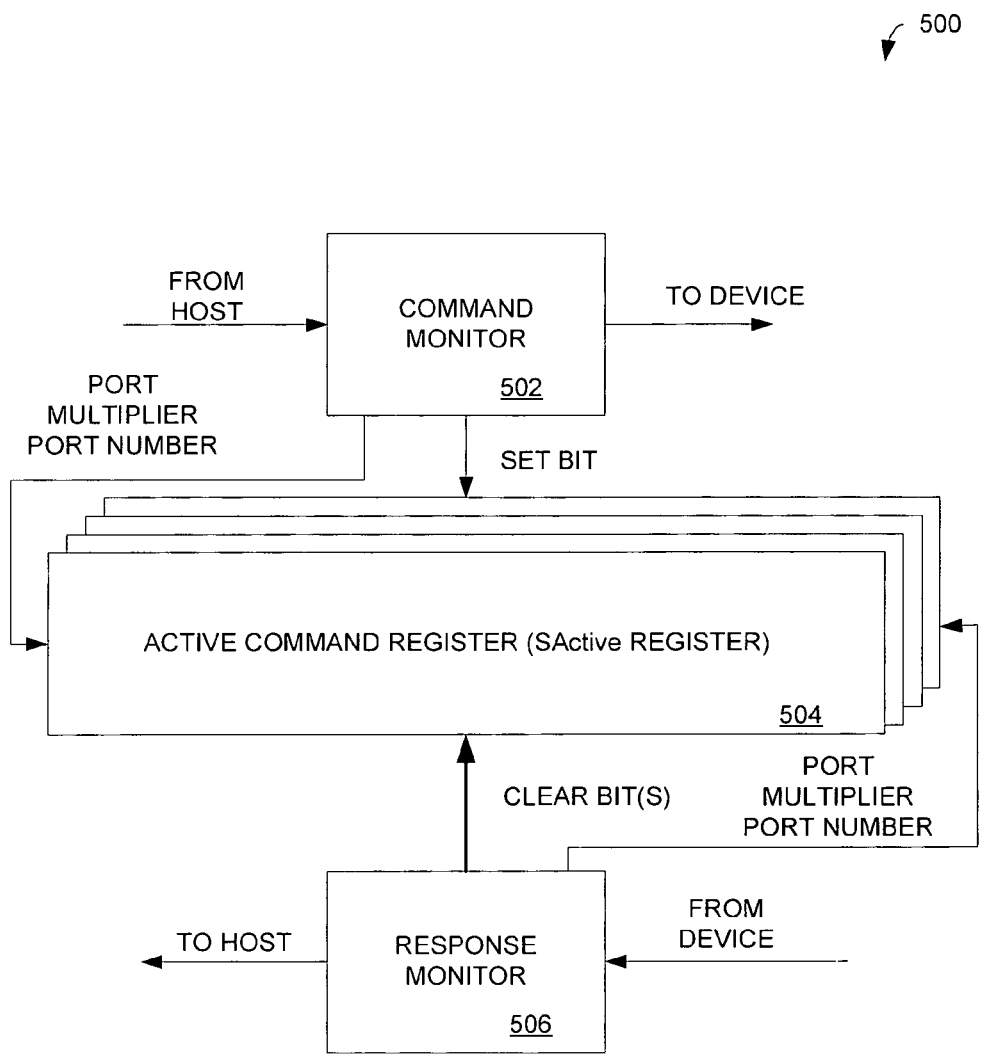
FIG. 5 is a block diagram of an embodiment of an affiliation manager that includes support for a multiple devices coupled through a port multiplier to the STP/SATA bridge shown in FIG. 1.
Figure 6:
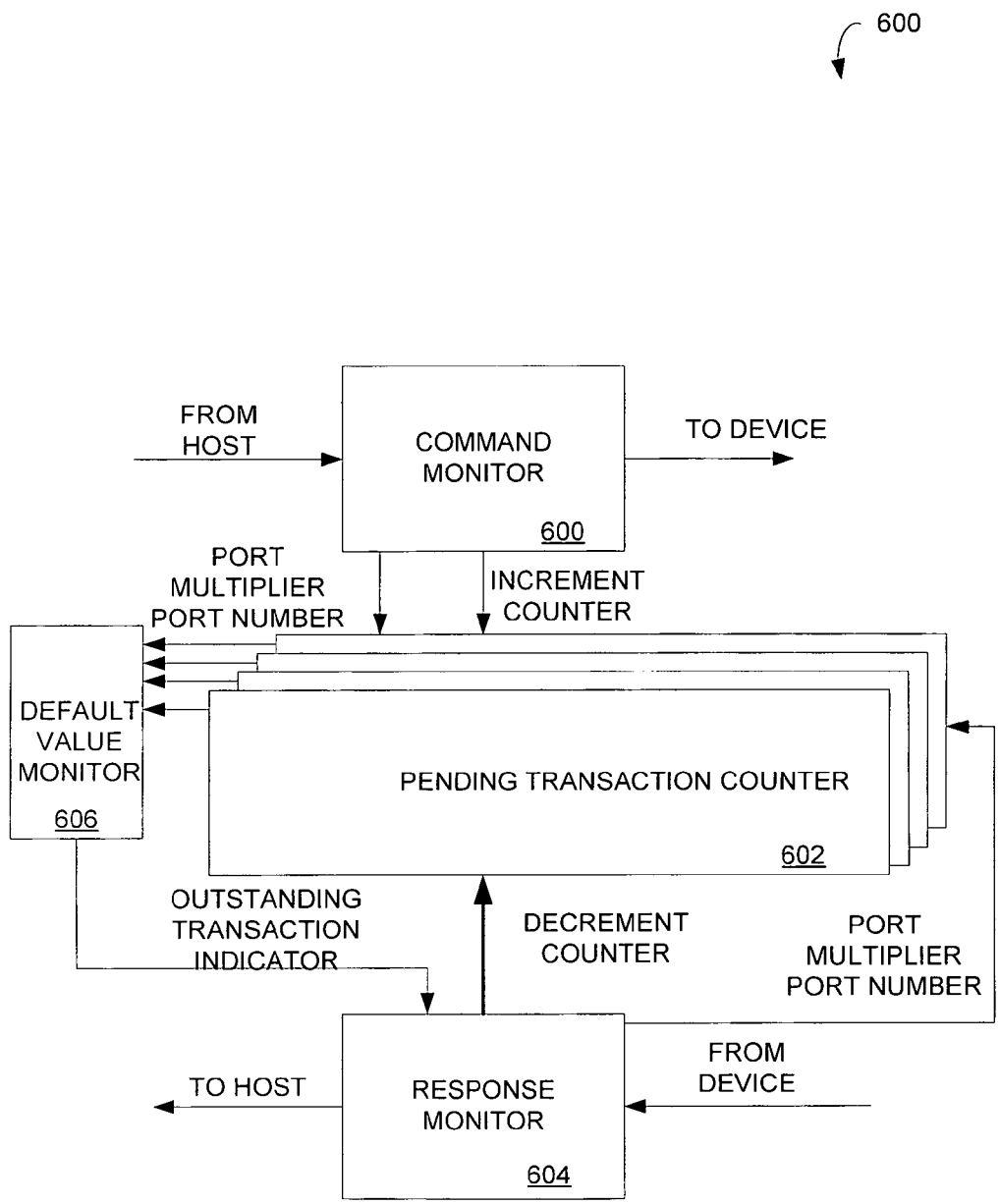
FIG. 6 is a block diagram of another embodiment of an affiliation manager that includes support for multiple devices coupled through a port multiplier to the STP/SATA bridge shown in FIG. 1.

FIG. 5 is a block diagram of an embodiment of an affiliation manager 500 that includes support for a plurality of SATA devices coupled through a port multiplier to the STP/SATA bridge 108 shown in FIG. 1.

The affiliation manager 500 includes one active command register 504 per device that may be coupled to a port multiplier through the SATA port. An STP host identifies the SATA device coupled to the port multiplier to which a command FIS is directed through a Port Multiplier Port (PMP) field in a FIS. For example, with four bits, the PMP field can identify one of 15 devices coupled to the port multiplier.

In a system that includes a port multiplier coupled to the SATA port in the STP/SATA bridge, the connection to the STP host can access any of the SATA devices coupled to the port multiplier. Thus, the affiliation manager 500 includes an active command register for each possible SATA device. The NCQ tag is extracted from a command FIS in order to set the appropriate bit in the active command register as discussed in conjunction with the embodiment for a connection from a STP host to a STP target to access a single SATA device coupled to the STP/SATA bridge. The affiliation manager 500 also extracts the PMP field in the command FIS to determine to which SATA device the command is being directed.

In addition to the active command bits that identify the queued and completed commands, the Set Device Bits FIS also includes a PMP field which is used as an index to select the active command register associated with the SATA device at the other side of the port multiplier from which the Set Device Bits FIS is being sent.

When the command FIS passes through the STP/SATA bridge 108, the affiliation manager 500 extracts the Port Multiplier Port (PMP) field to use as an index to select the active command register associated with the SATA device. The NCQ tag is used to select the bit within the selected active command register. As the STP host associated with the current connection may have pending commands in each of the SATA devices at the other side of the port multiplier, the STP/SATA bridge waits for all of the active command registers to be cleared before determining whether to switch the active connection to another STP host.

FIG. 6 is a block diagram of another embodiment of an affiliation manager 600 that includes support for multiple devices coupled through a port multiplier to the STP/SATA bridge 108 shown in FIG. 1.

The affiliation manager 600 includes a pending transaction counter 602 for each SATA device accessible through the port multiplier. The value of the PMP field in the command FIS and the Set Device Bits FIS or device to host status register FIS is used as an index to select the counter associated with the SATA device. The default value monitor 606 monitors the values of each of the pending transaction counters and provides an indication of whether all pending commands have been completed by determining whether the default values are stored in each of the pending transaction counters. By keeping track of pending commands sent to the host, the affiliation manager 600 can automatically transfer control to another STP host when all of the counters are at default values and there is another STP host requesting access to the STP/SATA bridge. The STP/SATA bridge sends a close connection to the original STP host and accepts a new connection with the other STP host.

Thus, by providing affiliation management in the STP/SATA bridge, each STP host does not have to include support for affiliation management. Also, the time period for switching a connection from a current STP host to another STP host is reduced.

In addition to being included in an embodiment of a STP/SATA bridge, the affiliation manager may be easily included in any system that uses SATA Native Command Queuing (NCQ) because the affiliation manager is less dependent on application software and firmware than prior affiliation methods.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

What is claimed is:

1. An apparatus comprising:
   a first port to receive commands from a host using a first protocol, wherein the first protocol is Serial Advanced Technology Attachment Tunneled Protocol (STP) protocol;
   a second port to forward commands to a device using a second protocol, wherein the second protocol is Serial Advanced Technology Attachment (SATA) protocol; and
   an affiliation manager to monitor commands and responses for an established connection between the host and the device and to automatically close the connection upon detecting no pending commands associated with the device upon detecting an access request from another host, wherein the device is to be coupled to the host through a port multiplier, the port multiplier allowing the host to communicate with a plurality of devices on the established connection to the port multiplier and the affiliation manager to monitor pending commands associated with the plurality of devices, and wherein the affiliation manager monitors pending commands through a plurality of registers, with each register associated with one of the devices and each register having a bit per pending command, said bit to be set upon detecting a command issued to the device and to be cleared upon detecting that the command is no longer pending.

2. The apparatus of claim 1, wherein the affiliation manager is to accept a new connection to the other host after closing the connection to the host.

3. The apparatus of claim 1, wherein the affiliation manager monitors pending transactions by incrementing a count based on a command received from the host to the device and decrementing the count based on a response received from the device.

4. The apparatus of claim 1, wherein the affiliation manger monitors pending transactions through a register having a bit per transaction, the bit to be set upon detecting a command and to be cleared upon detecting a response for the command.

5. A method comprising:
   receiving commands from a host through a first port using a first protocol, wherein the first protocol is Serial Advanced Technology Attachment Tunneled Protocol (STP) protocol;
   forwarding commands to a device through a second port using a second protocol, wherein the second protocol is Serial Advanced Technology Attachment (SATA) protocol;
   monitoring, by an affiliation manager, commands and responses for an established connection between the host and the device; and
   detecting, by the affiliation manager, no pending commands associated with the device; and
   automatically closing the connection, by the affililiation manager, upon detecting no pending commands for the device upon detecting an access request from another host, wherein monitoring further comprising: monitoring pending commands associated with a plurality of devices accessible by the host for the connection through a port multiplier, and providing a plurality of registers, each register associated with one of the devices and each said register having a bit per pending command; upon detecting a command issued to one of the devices, setting the bit in the register associated with the device; and upon detecting that the command is no longer pending, clearing the bit in the register.

6. The method of claim 5, further comprising:
   accepting, by the affiliation manager, a new connection to the other host after closing the connection to the host.

7. The method of claim 5, wherein monitoring further comprises:
   incrementing a count based on a command sent from the host to the device; and
   decrementing the count based on a response from the device.

8. The method of claim 5, wherein monitoring further comprises:
   upon detecting a command, setting a bit in a register having a bit per transaction; and
   upon detecting a response, clearing the bit in the register corresponding to the transaction.

9. A computer readable storage medium medium including a computer readable code stored theron having associated information,
wherein the information, when accessed, results in a machine performing:
   receiving commands from a host using a first protocol, wherein the first protocol is Serial Advanced Technology Attachment Tunneled Protocol (STP) protocol;
   forwarding commands to a device using a second protocol, wherein the second protocol is Serial Advanced Technology Attachment (SATA) protocol;
   monitoring commands and responses for an established connection between the host and the device;
   detecting no pending commands associated with the device; and
   automatically closing the connection upon detecting no pending commands for the device upon detecting an access request from another host, wherein monitoring further comprising: monitoring pending commands associated with a plurality of devices accessible by the host for the connection through a port multiplier, and providing a plurality of registers, each register associated with one of the devices and each said register having a bit per pending command; upon detecting a command issued to one of the devices, setting the bit in the register associated with the device; and upon detecting that the command is no longer pending, clearing the bit in the register.

10. The computer usable medium of claim 9, further comprising:
    accepting a new connection to the other host after closing the connection to the host.

11. A system comprising:
    a disk drive; and
    a bridge coupled to the disk drive, the bridge comprising:
    a first port to receive commands from a host using a first protocol, wherein the first protocol is Serial Advanced Technology Attachment Tunneled Protocol (STP) protocol;

a second port to forward commands to the disk drive using a second protocol, wherein the second protocol is Serial Advanced Technology Attachment (SATA) protocol; and an affiliation manager to monitor commands and responses for an established connection between the host and disk drive and to automatically close the connection upon detecting no pending commands for the device associated with the disk drive upon detecting an access request from another host, wherein the device is to be coupled to the host through a port multiplier, the port multiplier allowing the host to communicate with a plurality of devices on the established connection to the port multiplier and the affiliation manager to monitor pending commands associated with the plurality of devices, and wherein the affiliation manager monitors the pending commands through a plurality of registers, with each register associated with one of the devices and each register having a bit per pending command, said bit to be set upon detecting a command issued to the device and to be cleared upon detecting that the command is no longer pending.

12. The system of claim 11, wherein the affiliation manager is to accept a new connection to the other host after closing the connection to the host.

* * * * *